United States Patent [19]

Kuepfer

[11] Patent Number: 4,952,940
[45] Date of Patent: Aug. 28, 1990

[54] RADAR SYSTEM WITH A DIGITAL EXPANDER

[75] Inventor: Hanspeter Kuepfer, Birmensdorf, Switzerland

[73] Assignee: Siemens-Albis, Zurich, Switzerland

[21] Appl. No.: 298,440

[22] Filed: Jan. 18, 1989

[30] Foreign Application Priority Data

Jan. 18, 1988 [SE] Sweden ................. 8800158

[51] Int. Cl.⁵ ............................................. G01S 7/40
[52] U.S. Cl. ................................. 342/174; 342/202; 342/204; 342/201
[58] Field of Search ............... 342/174, 202, 203, 204, 342/201

[56] References Cited

U.S. PATENT DOCUMENTS

| | | | |
|---|---|---|---|
| 3,852,746 | 12/1974 | Lowenschuss et al. | 343/17.2 PC |
| 4,003,054 | 1/1977 | Goldstone | 343/17.7 |
| 4,028,700 | 6/1977 | Carey et al. | 343/17.2 PC |
| 4,521,779 | 6/1985 | Lewis | 342/194 |
| 4,524,363 | 6/1985 | Kretschmer | 342/201 |
| 4,566,011 | 1/1986 | Lewis et al. | 342/201 |
| 4,661,819 | 4/1987 | Lewis | 342/201 |
| 4,728,958 | 3/1988 | Choate | 342/424 |
| 4,734,699 | 3/1988 | Kretschmer, Jr. | 342/201 |
| 4,833,479 | 5/1989 | Carlson | 342/194 |

OTHER PUBLICATIONS

Patent Abstracts of Japan, vol. 9, No. 195 (P-379) (1918), Aug. 13, 1985; & JP-A-60 61 667 (Mitsubishi Denki K.K.) 09-04-1985.
IEEE-IGARSS '86, vol. II, Aug. 1986, ESA, SP-254, pp. 1195-1200, Paris, FR.
K. Tanaka et al.: "Pulse Compression Test Results of the SAR Transmitter . . . ", European Search Report No. RS 81204 CH.

Primary Examiner—Thomas H. Tarcza
Assistant Examiner—John B. Sotomayor
Attorney, Agent, or Firm—Adel A. Ahmed

[57] ABSTRACT

In a radar system, comprising a digital expander, two analog modulation signals are generated with two digital to analog converters and raised to an intermediate frequency range through a quadrature modulator. The amplitude and phase ripple of the output signal occurring in the quadrature modulator due to limited carrier and image frequency suppression are compensated through a multiple regulating circuit. To this end, if necessary calibration signals, of constant amplitude and different phase positions, are generated sequentially by means of the two digital to analog converters and the amplitude of their output signals measured in an amplitude detector. Setting values for the multiple regulating circuit are determined from the averaged amplitude measured values in a phase and amplitude correction unit which via setting elements set the requisite offset and phase and amplitude symmetry values until the deviations of the output signal in amplitude and phase disappear.

12 Claims, 3 Drawing Sheets

RADAR SYSTEM WITH A DIGITAL EXPANDER

BACKGROUND OF THE INVENTION

The invention relates to a radar system in which are provided a digital expander at the transmitter end and a pulse compression technique at the receiver end for evaluation wherein, furthermore, a digital storage clocked by a central control unit is provided for generating the transmitter pulse, from which contents via a first digital to analog converter, an analog baseband signal, and via a second digital to analog converter an analog baseband quadrature signal is derived and supplied to a quadrature modulator which provides at the output side at an intermediate frequency range a transmitter pulse to the actual transmitter via a gate controlled by the central control unit.

Radar systems which are to have a wide range as well as high distance resolution can be realized through pulse compression technology. The transmitter signal is an expanded frequency- or phase-modulated pulse which at the receiver end is compressed in a correlator which is known as compressor. In analog technique the necessary expansion of the transmitter signal has been realized in the course of time in different ways. The properties of analog delay lines, such as for example a SAW device, corresponding to the requirements for greater transmitter pulse length and sufficient side lobe suppression, are at best less than perfect and, moreover, can frequently only be realized with a high degree of complexity. For generating an expanded modulated transmitter signal, digital expander systems would be the ideal realization for the requirements in view of the pulse compression technique. Advantageously fully coherent waveforms could be achieved with digital expander systems, as could an excellent signal to noise ratio, as well as a guaranteed exchangability of the modulation code. In the most frequently used technique for the synthesis of an arbitrary waveform, the waveform is read out of the storage at constant clock frequency. A digital to analog conversion followed by an upward mixing supplies an expanded high-frequency signal. In mixing the modulating signal onto an added carrier signal (upward mixing) either double sideband or single sideband mixing can be used. Single sideband mixing does require quadrature modulation, but in many respects would be more advantageous: compared to double sideband mixing a greater signal bandwidth could be generated and the filter requirements would be considerably less critical. Of disadvantage is the limited carrier and image frequency suppression of commercially available quadrature mixers which cannot be eliminated through filters and does not always suffice for good correlation properties (side lobe suppression) in the receiver. Likewise the requisite high level stability of the carrier signal as well as the high balancing complexity is a serious disadvantage in practice. The known digital expander system therefore meets the demands such as are encountered in pulse compression technology only conditionally.

SUMMARY OF THE INVENTION

A task of the invention is to provide a radar system with a digital expander with which a sufficiently good side lobe suppression in the receiver with high bandwidth of the transmitter signal is ensured over a wide temperature range without an elaborate balancing operation and stabilization of the carrier signal level being required.

This task is solved according to the invention in that by means of two digital to analog converters, depending on need, calibration signals of constant amplitude, however having different phase positions, are generated sequentially, in that for each phase position the amplitude value of the output signal corresponding to the particular calibration signal is measured in an amplitude detector, and that a regulating circuit is provided in which from the particular averaged measured amplitude values, setting values are determined in a phase and amplitude correction unit which via setting elements set the requisite offsets and phase and amplitude symmetry values until the deviations of the output signal in amplitude and phase disappear. The amplitude and phase ripple of the output signals (transmitter signals) occurring due to limited carrier and image frequency suppression are corrected in a regulating circuit by means of an amplitude and phase correction unit. Under application of quadrature modulation an ideal wave train can be radiated with which at the receiver good correlation properties and a therefrom resulting good side lobe suppression can be achieved at high signal bandwidth.

Further advantageous implementations of the invention are recited in the subclaims.

BRIEF DESCRIPTION OF THE DRAWINGS

Below, an exemplary embodiment of the invention is explained in greater detail in conjunction with drawings in which.

DESCRIPTION OF THE PREFERRED EMBODIMENT

Figure 1:
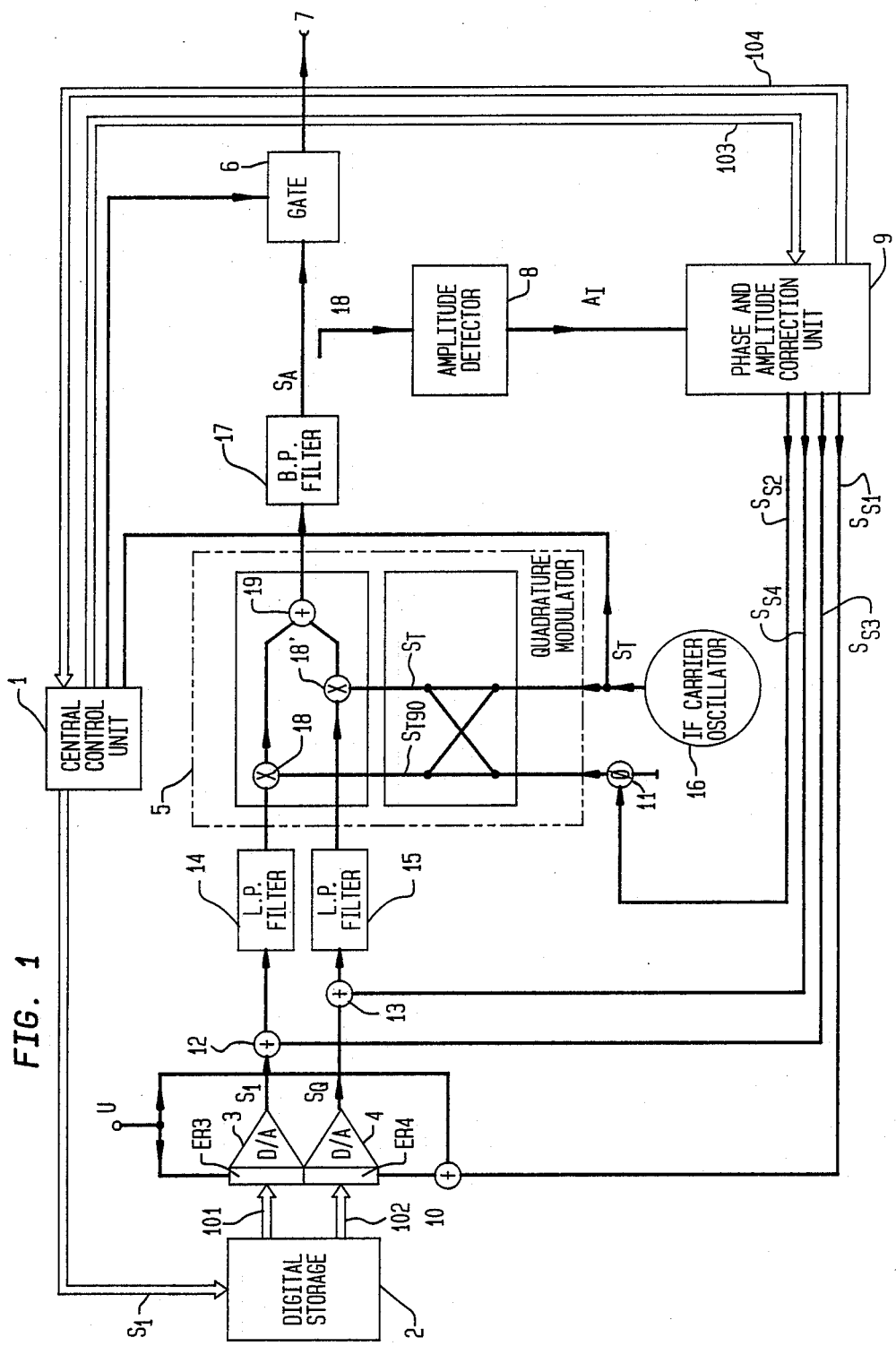
FIG. 1 shows a block diagram of a digital expander for a radar system according to the invention.

The expander according to FIG. 1 has a digital storage 2 which is connected via lines 101 and 102 to a first digital to analog converter 3 and a second digital to analog converter 4. The output signals $S_I$ and $S_Q$ of the two digital to analog converters 3 and 4 are conducted via setting elements 12 or 13 and subsequent low-pass filters 14 and 15 to a quadrature modulator 5. The quadrature modulator 5 is impressed via an additional input with a signal S. originating from an intermediate frequency carrier oscillator 16, and on the output side connected via a bandpass filter 17 to a gate 6 whose output 7 is connected to a transmitter device. The system further comprises a regulating circuit in whose signal path an amplitude detector 8 as well as a phase and amplitude correction unit 9 following it are inserted. On the input side, amplitude detector 8 is impressed with signal $S_A$ branched off at the output of bandpass filter 17, with the setting values $S_{S1}$, $S_{S2}$, $S_{S3}$, and $S_{S4}$ being supplied at the output of phase and amplitude correction unit 9 to corresponding setting elements 10, 11, 12, and 13. The reference input ER3 of digital to analog converter 3 as well as a further input of setting element 10 are connected with a reference voltage source U, with setting element 10 being connected at the output side to the reference input ER4 of digital to analog converter 4. Setting element 11 is connected at the output side to a further input of quadrature modulator 5. A central control unit 1 is connected to carrier oscillator 16, gate 6, and phase and amplitude correction unit 9, as well as to digital storage 2.

Figure 2:
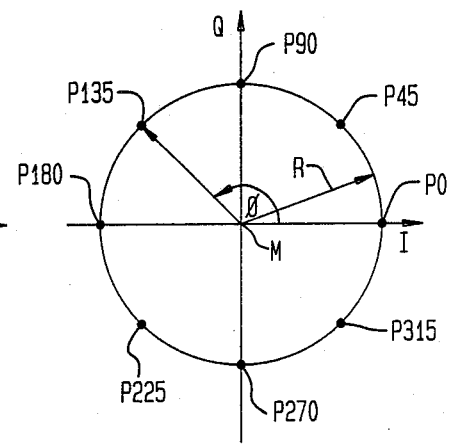
FIG. 2 shows a vector diagram for an ideal signal formed from I and Q components.

The manner of operation of the system according to FIG. 1 is elucidated in conjunction with the vector diagram depicted in FIGS. 2 to 5. In digital storage 2, the wave train to be modulated onto carrier signal S; is digitally encoded. The storage contents contain the in-phase as well as the quadrature component of the wave train with both wave trains being read into digital to analog converters 3 and 4 via lines 101 and 102 with constant clock frequency. The clock rate is determined by a control signal $S_1$ from central control unit 1 and may, for example, be 20 MHz. An analog baseband signal $S_1$ is generated in digital to analog converter 3, and an analog baseband signal $S_Q$ is generated in digital to analog converter 4, these signals being in phase quadrature with respect to each other. The signal vectors comprising the I-component and Q-component form dynamic modulation signals (i.e. varying with respect to their phase and amplitude) which generate the phase-encoded transmitter pulse. A significant aspect of the invention resides in that apart from the actual operation of the device (generation of phase-encoded transmitter signals) in storage 2 sequentially (potentially cyclically) calibration signals $P_0$, $P_{45}$, $P_{90}$, $P_{135}$ etc. up to $P_{315}$ are generated. These calibration signals $P_0$ to $P_{315}$ are static signal vectors comprising the I- and Q-components which are generated for a given length of time and in a sequence yet to be defined, and function for amplitude and phase adjustment (calibration) of the phase-encoded baseband signals $S_I$ and $S_Q$. (FIG. 2). The amplitudes R of these signal vectors $I^2 + Q^2$ must all be identical and should correspond approximately to the constant nominal amplitude of the waveform generated in operation. The phases $\phi$ of the signal vectors are to correspond in terms of degrees to the values given in the indices of the modulation signals (for example $0135 = 135$ degrees at $P_{135}$). The baseband signals $S_I$ and $S_Q$ (FIG. 1) are supplied via a lowpass filter 14 or 15, which removes the high-frequency signal components, to the quadrature modulator 5 and modulated onto the added carrier signal $S_1$ (single sideband mixing). In the quadrature modulator through a 90° phase rotation from the carrier signal $S_T$ a signal $S_{T90}$ is generated which is supplied to mixer 18 and 18' in which signal $S_I$ or respectively $S_Q$ is multiplicatively modulated onto the carrier signal $S_T$ or $S_{T90}$. A superposition of the modulated carrier signal in the succeeding summer 19 yields the output signal SA which passes through a bandpass filter 17 to remove the harmonics and reaches via a gate 6 the actual transmitter (output 7). The gate 6 functions for the clean blanking of the waveform and is controlled by the central control unit 1. The above described uncompensated system (i.e. operating without calibration signals) will, due to limited carrier and image suppression through the quadrature modulation have an amplitude and phase ripple deviating from the from the ideal wave train according to FIG. 2. Through the compensation circuit (multiple regulation circuit) indicated below it is possible to generate a wave train which has a good carrier and image suppression at an approximately constant amplitude for its duration typical for radar applications. Advantageously, a self-compensating adjustment with the aid of the calibration vectors $P_0$ to $P_{315}$ can be initiated if the gate 6 is closed so that at the output no disturbing signals occur. This can take place before operation is started, during operation breaks or during operation in the pulse gaps. To this end via a decoupler 18 a small part of an output signal $S_A$ generated through a calibration signal is supplied to a regulating circuit with amplitude detector 8 and succeeding phase and amplitude correction unit 9. For each of the calibration signals $P_0$ to $P_{315}$ generated by the digital to analog converters 3 and 4, the amplitude $A_0$ to $A_{315}$ originating after completed modulation is measured with the amplitude detector 8. In the following phase and amplitude correction unit 9 the measured values $A_0$ to $A_{315}$ are averaged and therefrom the setting values $S_{S1}$ to $S_{S4}$ derived which compensate the amplitude and phase ripple of the transmitter pulse. Since static calibration vectors $P_0$ to $P_{315}$ are used, good averaging of the corresponding measured values $A_0$ to $A_{315}$ is possible whereby a particularly precise adjustment can be carried out. The amplitude detector 8 must be shielded and uncoupled from the carrier source (carrier oscillator 16).

Figure 5:
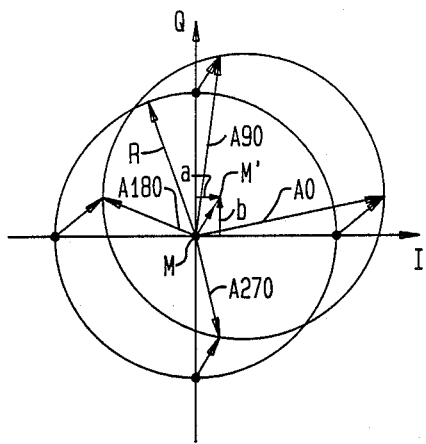
FIG. 3 to 5 show vector diagrams for signals formed of I and Q components with different symmetry disturbances.
Figure 4:
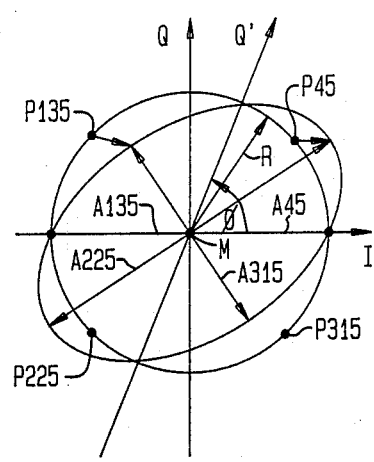

In an ideal system all measured values $A_0$ to $A_{315}$ would precisely assume the required constant amplitude value R. But the errors in the system to be compensated generate deviations so that, in general, the amplitude value R is not equal to the amplitude values $A_0$ to $A_{315}$ detected after quadrature modulation. Through phase errors in the system, if, for example, the phase shift between the baseband signals $S_I$ and $S_Q$ or the phase shift between the carrier signals $S_T$ and $S_{T90}$ is not exactly 90°, complete image frequency suppression is prevented. Similarly, offset errors, i.e. the offsets occurring at the output of the digital to analog converters 3 and 4 and in the quadrature modulator 5 lead to incomplete carrier suppression. The vector diagrams according to FIGS. 3 to 5 show the signals occurring at amplitude detector 8 and how these effect the measured values $A_0$ to $A_{315}$ in the presence of system imperfections.

Figure 3:
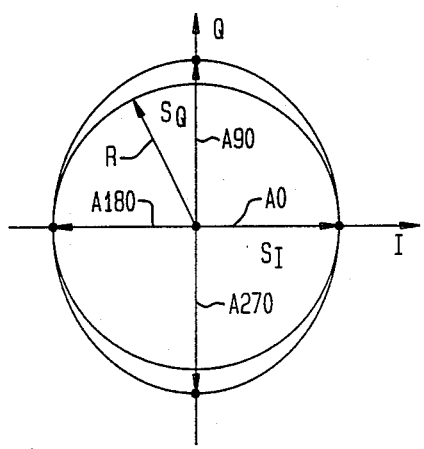

In FIG. 3 a vector diagram for a system with disturbed amplitude symmetry is shown, where the ratio $S_Q/S_I$ deviates slightly from 1. The amount of the signal vector $S_Q$ of the quadrature signal is, for example, compared to the constant ideal amplitude value R somewhat increased through which the envelope of the signal vectors $S_I$ and $S_Q$ changes from a circle with center M (ideal form at constant R) into an elliptical shape. Advantageously, with the aid of the calibration signals $P_0$, $P_{90}$, $P_{180}$, and $P_{270}$ by measuring their four amplitude values, specifically $A_0$, $A_{90}$, $A_{180}$, and $A_{270}$, in the amplitude detector 8 the ratio $S_Q$ to $S_I$ can be determined in the following manner:

$$S_Q/S_I = \frac{A_{90} + A_{270}}{A_0 + A_{180}}$$

Accordingly, a control value $ST_1$ for regulating the amplitude symmetry can be gained by the following difference formation $$ST_1 = (A_{90} - A_0) + (A_{270} - A_{180}),$$

where this control value $ST_1$ is regulated against 1 for eliminating the amplitude asymmetry.

FIG. 4 shows a vector diagram for a system with disturbed phase symmetry, in which the phase angle 0 between the base signal $S_I$ and $S_Q$ deviates slightly from 90° (axis Q′). The measured amplitude values $A_{45}$, $A_{135}$, $A_{225}$, and $A_{315}$ correspond to the amplitude value R of the calibration signals $P_{45}$, $P_{135}$, $P_{225}$, and $P_{315}$, where the envelope of the signal vectors $S_I$ and $S_Q$ changes from the ideal circular shape (system without errors) with center M into an elliptical form. Advantageously, by measuring the amplitude values $A_{45}$, $A_{135}$, $A_{225}$, and $A_{315}$ the phase angle relationship $$\frac{90-0}{2}$$

can be determined as an approximation:

$$\frac{90-0}{2} = \frac{A_{45} - A_{135} - A_{225} - A_{315}}{A_{45} + A_{135} + A_{225} + A_{315}}.$$

A control value $ST_2$ for regulating the phase asymmetry is gained through the following difference formation: $ST_2 = (A_{45} - A_{135}) + (A_{22} - A_{315})$ with this control value being regulated against 0 for the suppression of the phase asymmetry.

Amplitude and phase asymmetry prevent complete image frequency suppression in the system.

In FIG. 5 a vector diagram for a system is introduced which has in the I as well as also in the Q channel the offsets a =0 or b=0, and hence limited carrier suppression. The circuit formed by the envelope of the signal vectors $S_I$ and $S_Q$ (center M, radius R) is displaced through the offsets a and b into a new position (center M′). Consequently, the amplitude values measured in the amplitude detector 8 will deviate from the ideal value R as is shown for the amplitude values $A_0$, $A_{90}$, $A_{180}$, and $A_{270}$ corresponding to calibration signals $P_0$, $P_{90}$, $P_{180}$, and $P_{270}$. The I offset a as well as the Q offset b can advantageously be determined as an approximation by measuring the amplitude values $A_0$, $A_{90}$, $A_{180}$, and $A_{270}$: $a = A_0 - A_{180}$ $b = A_{90} - A_{270}$. The determination of a control value $ST_3$ for the I offset a as well as of a control value $ST_4$ for the Q offset b takes place through the following difference formation:

$$ST_3 = A_0 - A_{180}$$

$$ST_4 = A_{90} - A_{270}$$

where both control values $ST_3$ and $ST_4$ are regulated to 0 for offset compensation. Through the offsets a complete carrier frequency suppression is prevented.

Of particular significance is the property of the above cited method to supply, in the event of small interference magnitudes, control values which are linearly independent of each other. The independence can be readily verified if the influence of interference effects combined in any given way is examined. If, for example, the Q offset b changes, then the difference $A_{90} - A_{270}$ is influenced as planned, not however the measured value for the amplitude asymmetry which contains the sum $A_{90} + A_{270}$, remaining constant in this instance. If the phase asymmetry changes, then on the other hand, for example, the measured value for the Q offset is not influenced since it is represented by the difference $A_{90} - A_{270}$, which remains constant. With the control values the appropriate setting elements for the compensation of offset and symmetry are now accessed.

Thus, at most, four regulating circuits are formed by the phase and amplitude correction unit 9 according to FIG. 1, which are independent of each other and which, depending on the selection and sequence of the individual measurements through the amplitude detector 8, more or less simultaneously or sequentially will iterate in such a way that the control values $ST_1$ to $ST_4$ become arbitrarily small. Through the zero adjustment of the control values $ST_1$ to $ST_4$ in the phase and amplitude correction unit 4 appropriate setting values $S_{S1}$, $S_{S2}$, $S_{S3}$, and $S_{S4}$ are determined, which are supplied to the setting elements 10, 11, 12, and 13. Specifically from the control value $ST_1$ (amplitude asymmetry) the setting value $S_{S1}$ is derived and supplied to setting element 10. The setting value $S_{S2}$ derived from control value $ST_2$ (phase asymmetry) is conducted to setting element 11. Setting values $S_{S3}$ and $S_{S4}$ (I and Q offset) are assigned to control values $ST_3$ or $ST_4$ and are supplied to setting elements 12 or 13. For purposes of control and synchronization the phase and amplitude correction unit 9 may be connected via signal lines 103 and 104 with the central control unit 1 to which, in turn, the carrier signal $S_T$ of the carrier oscillator 16 may be supplied for purposes of synchronization.

In processing the control values $ST_1$ to $ST_4$ in the phase and amplitude correction unit 9 different solutions are conceivable, as they are in the realization of the setting elements 10 to 13.

The setting elements could also be realized in digital technique instead of in analog technique, as in FIG. 1. For example, the setting element 10 can be realized in digital form in which the selection of the digital to analog converter 3 and 4 would be corrected appropriately in that the nominal selection (from storage 2) is converted into a corrected value in such a way that the determined control values $ST_1$ would disappear. This realization, however, requires a very high resolution of the digital to analog converter 3 and 4 which together with the required high clock rate at this time is still difficult to achieve. With it the conversion to the corrected value can hardly take place rapidly enough without serious bandwidth limitation.

Similarly, the control values can be generated in digital, analog or mixed technique. If the individual values $A_0 - A_{315}$ are converted digitally and stored then for this purpose a very good resolution of the analog to digital converters is required since in the end a small difference of large values can be decisive. In order to circumvent them, advantageously a partially analog realization of the phase and amplitude correction unit 9 is suggested.

Below, reference is made to FIG. 6 in which details of the phase and amplitude correction unit 9 are shown. In the phase and amplitude correction unit 9 an analog operating storage and difference formation unit 20 and an adjustment unit 40 in digital technique are provided. The amplitude detector 8 is connected via a resistor 21 with an input line 22. 5 output lines 24, 25, 26, 27, and 28 are connectable via a change-over switch 23 to the input line 22. The output lines 24 and 25 are connected to the inputs of a first difference amplifier 32 and connected to zero potential via capacitors 28 and 29. The inputs of a second difference amplifier 33 are connected to the output lines 26 and 27 which likewise are connected to the zero potential via capacitors 30 and 31. An output line 34 of the difference amplifier 32 as well as an output line 35 of the difference amplifier 33 are connected at the input side to a summing amplifier 36. In the succeeding adjustment unit 40 the output lines 34 and 35 as well as the output line 37 of the summing amplifier 36 are connectable via a change-over switch 41 to the input line 42. The input line 42 is connected to an analog to digital converter, in the simplest case to a comparator 43 which is succeeded by a control device 44. A storage 45 is connected on the input side with the control device 44 and at the output side to four digital to analog converters 46, 47, 48, and 49. The control device 44 is connected to the change-over switches 23 and 41 as well as via lines 103 and 104 to the central control unit 1 (FIG. 1).

The circuit according to FIG. 6 functions in the following way: in order to carry out an amplitude and offset compensation according to FIG. 3 or FIG. 5 the calibration signals $P_0$, $P_{90}$, $P_{180}$, and $P_{270}$ are cyclically generated with gate 6 being simulanteously closed. Thereby the calibration signals $P_0$ to $P_{270}$ are prevented from reaching the transmitter device 7 (FIG. 1). In a first cycle the amplitudes $A_0$, $A_{90}$, $A_{180}$, and $A_{270}$ of output signals $S_A$ corresponding to the phase-shifted calibration signals $P_0$, $P_{90}$, $P_{180}$, and $P_{270}$ are measured in the amplitude detector 8 and sequentially stored via the change-over switch 23 in appropriate capacitors 28, 29, 30, and 31. The calibration signals $P_0$ to $P_{270}$ all have identical amplitudes and are each phase-shifted sequentially by 90°. Each of the calibration signals, for example $P_0$, is generated for such a length of time that the particular amplitude measurement, for example $A_0$, and its storage can be carried out, whereupon the next calibration signal, for example $P_{90}$, is generated and its amplitude, for example $A_{90}$, is measured. In a subsequent cycle the calibration signals $P_0$ to $P_{270}$ are generated and in analogous manner the measured amplitude measured values $A_0$ to $A_{270}$ stored in capacitors 28 to 31. Several of these cycles are completed until the regulating circuit iterates and the amplitude values $A_0$ to $A_{270}$, averaged from the individual cycles are available in capacitors 28 to 31. The control values $ST_1$ for the amplitude compensation as well as the control values $ST_3$ and $ST_4$ according to the equations in accordance with FIG. 5 for the offset compensation can be determined. From the averaged values $A_0$ to $A_{270}$ according to the equation in accordance with FIG. 3. From two or four of the stored averaged measured values $A_0$ to $A_{270}$ in the difference amplifiers 32 and 33 difference signals are formed which are supplied to an adder device 36. With the change-over switch 41 the individual difference signals can be taken from the difference amplifiers 32 and 33 (line 34 and 35) as well as the sum of the difference signals (line 37) in analog form as desired control values $ST_1$, $ST_3$, and $ST_4$. Specifically, the difference signal at line 34 corresponds, for example, to the control value $ST_3$, the difference signal at line 35, for example, to control value $ST_4$, and the sum difference signal at line 37 to control value $ST_1$. In the comparator unit 40 the three control values $ST_1$, $ST_3$, and $ST_4$ are applied by change-over switch 41 controlled by the control device 44 via line 42 to an analog to digital converter 43. Through appropriate control of change-over switch 41 via the control device 44 it is possible to allow three regulating circuits corresponding to control values $ST_1$, $ST_3$, and $ST_4$ iterate or build up either simultaneously or sequentially. If iteration of the individual regulating circuit takes place, for example, sequentially, in the comparator unit 40 initially a control value, for example $ST_1$, is conducted from change-over switch 41 via line 42 to the analog to digital converter 43. This analog to digital converter 43 is advantageously a 1 bit analog to digital converter or a comparator, where only the sign of the control value, for example $ST_1$, is used in order to increase or decrease in a closed regulating circuit an appropriate setting value, for example, $S_{S1}$ digitally via a counter incrementation or decrementation in one of the counters provided in the control device 44. After a given build-up time or as soon as the sign of the control value, for example $S_{T1}$, begins to alternate, the appropriate regulating circuit is in steady state and the setting value, for example $S_{S1}$, can be kept digitally in the intermediate storage 45. Thereupon the next regulating circuit is activated in which via change-over switches 41 the next control value, for example $S_{T2}$, is supplied to the analog to digital converter 43 and the determination of the appropriate setting value, for example $S_{S2}$, takes place in analog manner. Hence, for each of the control values $S_{T1}$, $S_{T3}$, and $S_{T4}$ the corresponding digital setting values $S_{S1}$, $S_{S3}$, and $S_{S4}$ are generated which are kept in digital form in the intermediary storage 45. The intermediary storage 45 is connected on the output side to one digital to analog converter 46, 47, and 48 each in order to generate analog setting values $S_{S1}$, $S_{S3}$, and $S_{S4}$. In reference to FIG. 1, the setting value $S_{S1}$ for compensating the amplitude error of the output signal $S_A$ is supplied to setting element 10. The setting values $S_{S3}$ and $S_{S4}$ compensate the offset errors of the system in that they are supplied to setting elements 12 and 13. After determining the setting values $S_{S1}$, $S_{S3}$, and $S_{S4}$ for the amplitude and offset compensation in a further cycle the calibration signals $P_{45}$, $P_{135}$, $P_{225}$, and $P_{315}$ are generated in the two digital to analog converters 3 and 4 (FIG. 1). From these calibration signals $P_{45}$ to $P_{315}$ in analog manner a setting value $S_{S2}$ is determined which permits the phase compensation of the output signal $S_A$. In several cycles the amplitudes $A_{45}$ to $A_{315}$ of the output signals $S_A$ corresponding to the phase-shifted calibration signals $P_{45}$ to $P_{315}$ are stored sequentially in capacitors 28, 29, 30, and 31 and their average determined. From the averaged amplitude values $A_{45}$ to $A_{315}$ in the comparator [SIC] unit 40 the control value $S_{T2}$ after the equation according to FIG. 4 is derived and supplied to the analog to digital converter 43. The digital setting value $S_{S2}$ corresponding to the control value $S_{T2}$ is supplied via the intermediate storage 45 to the digital to analog converter 49 in order to generate the analog setting value $S_{S2}$ at the output side. This setting value $S_{S2}$ is supplied to setting element 11 (FIG. 1) in order to compensate for the phase error of the output signal $S_A$.

As an alternative or as additional possibility transmission of the amplitude values, for example, $A_0$, $A_{90}$, $A_{180}$, $A_{270}$ can be carried out in that the calibration signal to be averaged before changing over to the next calibration signal is applied for such a length of time that in the time available formation of the average takes place already in the storage and difference formation unit 20.

Figure 6:
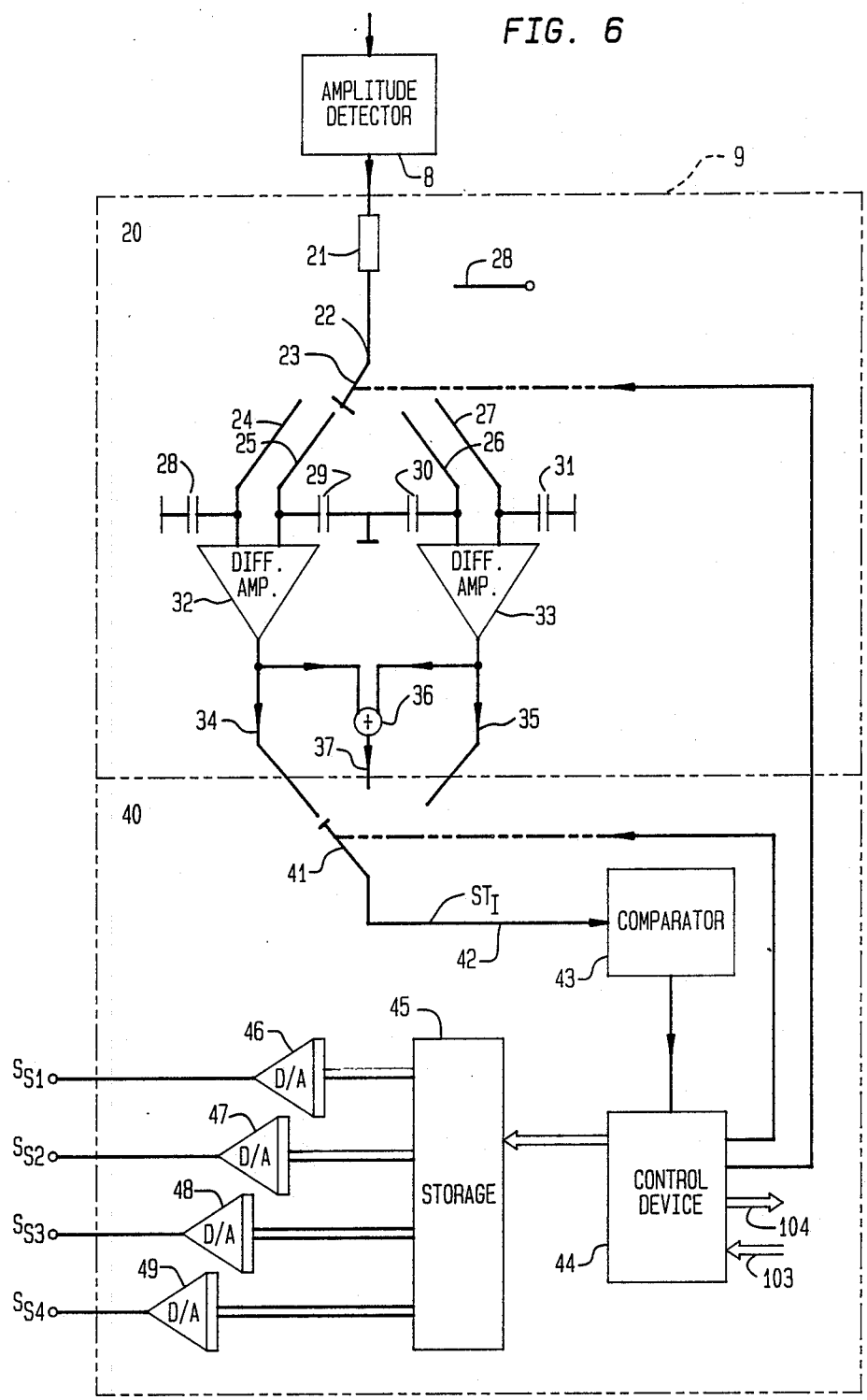
FIG. 6 shows a block circuit diagram of a phase and amplitude correction unit of an expander according to the invention.

Apart from the offsets of the difference and summing amplifiers 32, 33, and 36 used in FIG. 6, which can be built with small offset since they can operate at a low speed, all offsets are compensated through the suggested configuration; in particular also that of the amplitude detector 8 (difference formation).

Advantageously the above described digital expander system operates during self-adjustment and in operation with amplitudes of similar magnitude. Therewith, in addition, given non-linear effects of the mixer multiplication in the quadrature modulator 5 are also compensated.

With the digital expander system according to the invention by careful development a carrier and image frequency suppression of at least 50 dB can be achieved in the desired temperature range.

What is claimed:

1. A radar system, operating with phase-encoded transmitter pulses, wherein are provided, a digital expander at the transmitter end, and a pulse compression technique at the receiver end for evaluation, wherein, for generating the transmitter pulses a digital storage clocked by a central control unit is provided, from whose contents via a first digital to analog converter an analog baseband signal is derived and via a second digital to analog converter an analog baseband quadrature signal is derived and supplied to a quadrature modulator which on the output side provides a transmitter pulse in an intermediate frequency range via a gate controlled by the central control unit to the actual transmitter, characterized in that calibration signals are generated sequentially when required by means of the two digital to analog converters and different phase positions, in that for each phase position the amplitude value of the output signal corresponding to the particular calibration signal is measured in an amplitude detector, and in that a multiple regulating circuit is provided in which in a phase and amplitude correction unit setting values are determined, from the particular averaged amplitude measured values, which via setting elements set the required offsets and phase and amplitude symmetry values until the deviations of the output signal in amplitude and phase substantially disappear.

2. A radar system as recited in claim 1, characterized by two cycles which repeat, at least once, wherein respectively four successive calibration signals of constant amplitude, composed of an I and Q component, are generated and which exhibit mutual phase shifts of 90°.

3. A radar system as recited in claim 1, characterized in that control values which are linearly independent of one another are determined in the phase and amplitude correction unit through appropriate regular sum and/or difference formations from the phase-shifted averaged amplitude measured values.

4. A radar system as recited in claim 2, characterized in that control values which are linearly independent of one another are determined in the phase and amplitude correction unit through appropriate regular sum and/or difference formations from the phase-shifted averaged amplitude measured values.

5. A radar system as recited in claim 3, characterized in that in particular four control values specifically for the offset compensation of the baseband signal are determined from the averaged amplitude measured values, the offset compensation of the baseband quadrature signal, the compensation of the amplitude asymmetry of the output signal, and in that the individual control values are regulated in the closed multiple regulating circuit simultaneously or sequentially to an arbitrarily small value.

6. A radar system as recited in claim 4, characterized in that in particular four control values specifically for the offset compensation of the baseband signal are determined from the averaged amplitude measured values, the offset compensation of the baseband quadrature signal, the compensation of the amplitude asymmetry of the output signal, and in that the individual control values are regulated in the closed multiple regulating circuit simultaneously or sequentially to an arbitrarily small value.

7. A radar system as stated in claim 1, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

8. A radar system as stated in claim 2, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

9. A radar system as stated in claim 3, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

10. A radar system as stated in claim 4, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

11. A radar system as stated in claim 5, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

12. A radar system as stated in claim 6, characterized in that the phase and amplitude correction unit includes a storage and difference formation unit for storing at most four cyclically scanned amplitude measured values which are in each instance averaged over several cycles and subsequently supplied to analog difference and summing amplifiers, and in that a comparator unit is provided in which the individual control values are supplied to an analog to digital converter which in response to the sign of the particular control value provides a positive or negative one bit signal to a succeeding control device so as to digitally increase or decrease a corresponding setting value, and that after completed adjustment of a control value a succeeding intermediate storage receives digitally the appropriate setting value, whereupon the determination of the setting values corresponding to the other control values takes place in analog manner, and that the digital setting values are supplied in each instance to one of the digital to analog converters following the intermediary storage in order to generate appropriate analog setting values.

* * * * *

UNITED STATES PATENT AND TRADEMARK OFFICE
CERTIFICATE OF CORRECTION

PATENT NO. : 4,952,940

DATED : August 28, 1990

INVENTOR(S) : Kuepfer

It is certified that error appears in the above-identified patent and that said Letters Patent is hereby corrected as shown below:

ON TITLE PAGE:

Section (30), delete "(SE) Sweden ........... 8800158" and in its place insert

-- (CH) Switzerland ........... 00 158/88-8 --.

Signed and Sealed this

Tenth Day of March, 1992

Attest:

HARRY F. MANBECK, JR.

*Attesting Officer*  *Commissioner of Patents and Trademarks*